United States Patent [19]

Okita

[11] Patent Number: 5,307,098
[45] Date of Patent: Apr. 26, 1994

[54] PROJECTION INSPECTING MACHINE

[75] Inventor: Yukio Okita, Tokyo, Japan

[73] Assignee: Kabushiki Kaisha Topcon, Tokyo, Japan

[21] Appl. No.: 961,725

[22] PCT Filed: May 14, 1991

[86] PCT No.: PCT/JP91/00631

§ 371 Date: Jan. 12, 1993

§ 102(e) Date: Jan. 12, 1993

[87] PCT Pub. No.: WO92/21057

PCT Pub. Date: Nov. 26, 1992

[51] Int. Cl.⁵ .................. G02B 21/36; G03B 21/08
[52] U.S. Cl. ........................ 353/63; 353/76; 353/DIG. 3; 353/DIG. 4; 359/369
[58] Field of Search .................. 353/63, 64, 65, 66, 353/67, 74, 76, 77, 78, 82, DIG. 4, 39; 356/391, 396, 397, 392, 393; 359/369, 368, 381

[56] References Cited

U.S. PATENT DOCUMENTS

| 2,209,532 | 7/1940 | Michel | 359/369 |
| 2,477,396 | 7/1949 | Weiskoof | 353/39 |
| 2,518,240 | 8/1950 | Lowber et al. | 359/369 |
| 2,518,252 | 8/1950 | Reardon et al. | 359/369 |
| 3,572,884 | 3/1971 | Chirayath | 359/369 |
| 3,900,252 | 8/1975 | Disalvo et al. | 353/20 |
| 4,101,194 | 7/1978 | Miyazaki et al. | 359/369 |
| 4,279,482 | 7/1981 | Tyson | 353/65 |

FOREIGN PATENT DOCUMENTS

| 47-14770 | 5/1972 | Japan . | |
| 52-27636 | 3/1977 | Japan . | |
| 57-90409 | 6/1982 | Japan . | |
| 58-108418 | 7/1983 | Japan . | |
| 61-11121 | 1/1986 | Japan . | |
| 4-182615 | 6/1992 | Japan | 359/369 |
| 0788270 | 12/1957 | United Kingdom | 359/369 |

Primary Examiner—William A. Cuchlinski, Jr.
Assistant Examiner—William C. Dowling
Attorney, Agent, or Firm—Finnegan, Henderson, Farabow, Garrett & Dunner

[57] ABSTRACT

A projection inspector which projects the image of an object being measured onto a screen for a visual inspection. It may be used with a microscope for observation in detail. Unlike the conventional projection inspector, the inspector fully exhibits high degree of measuring function even at the time of inspecting an object having a surface color and shape that can be difficultly imaged, and projects the object's image onto the screen to inspect it, and further enables the object's image to be more correctly observed or inspected using a microscope. The projection inspector is provided with a projection lens mount that is movable two-dimensionally and mounts a projection lens that constitutes a portion of the projection optical system over a plate on which the object to be measured is placed, and the object's image is projected onto the screen via the projection optical system as it is irradiated with the light of illumination, wherein the projection lens mount is replaceable by a microscope mount having an eyepiece, a reference index is provided in the visual field of the eyepiece, and the plate is provided with an indicator that indicates the amount of movement.

1 Claim, 6 Drawing Sheets

PROJECTION INSPECTING MACHINE

BACKGROUND OF THE INVENTION

1. Field of the Invention

This invention relates to a projection inspecting machine, in which an image to be measured can be projected onto a screen for observation inspection and in which the image to be measured can be observed more correctly through a microscope.

2. Background of the Prior Art

There has been known a projection inspecting machine. In this conventional inspecting machine, a projection lens mount attaching base is disposed above a table capable of moving two-dimensionally. This table serves to support an object to be measured placed on it. A projection lens mount attaching base constitutes a part of a projection optical system and is served as a base to which a projection lens is to be attached. An observation inspection is carried out by observing an image of the object to be measured, the object projected, in an enlarged scale, onto a screen by means of emission of an illumination light through a projection optical system.

In this conventional projection inspecting machine, it is an important point that an observation inspection is carried out rapidly and correctly with respect to the object to be measured based on the image thereof. To this end, attention is paid to a method as to how to improve the projection accuracy of an image of the object to be measured onto the screen. However, much difficulty is encountered. The reason is that some objects have surface colors and shapes which are difficult to be shown as an image. Examples of such colors and shapes are black, mat-finished plastic step, R surface, and the like. Since there is limit in intensity of illumination, resolution, transmission factor, etc., if the object to be measured has such unfavorable colors and/or shapes, the conventional projection inspecting machine has difficulty in exhibiting its measuring function to the full extent.

SUMMARY OF THE INVENTION

It is therefore an object of the present invention to provide a projection inspecting machine, in which an image to be measured can be projected onto a screen for observation inspection and in which the image to be measured can be observed more correctly through a microscope.

To achieve the above object, from one aspect of the present invention, there is essentially provided a projection inspecting machine comprising a table capable of moving two-dimensionally and adapted to support an object to be measured, and a projection lens mount attaching base constituting a part of a projection optical system, disposed above the table and adapted to serve as a base to which a projection lens is to be attached, an observation inspection being carried out by observing an image of the object to be measured, the object projected onto a screen by means of emission of an illumination light through the projection optical system, wherein a projection lens is removably attached so as to be exchanged by a microscope mount including an ocular optical system, a reference target being provided within a view field of the ocular optical system, the table being provided with a moving amount indicating portion capable of indicating a moving amount thereof.

From another aspect of the present invention, there is provided a projection inspecting machine comprising a table capable of moving two-dimensionally and adapted to support an object to be measured, and a projection lens mount attaching base constituting a part of a projection optical system, disposed above the table and adapted to serve as a base to which a projection lens is to be attached, an observation inspection being carried out by observing an image of the object to be measured, the object projected onto a screen by means of emission of an illumination light through the projection optical system, wherein the projection inspecting machine further comprises a microscope lens-barrel portion including an ocular optical system and mounted on a main body of the projection inspecting machine, and further with optical system switch means enabling to observe the object to be measured through the microscope lens-barrel portion.

DETAILED DESCRIPTION OF THE EMBODIMENTS

A projection inspecting machine according to the present invention will now be described with reference to the accompanying drawings.

Figure 1:
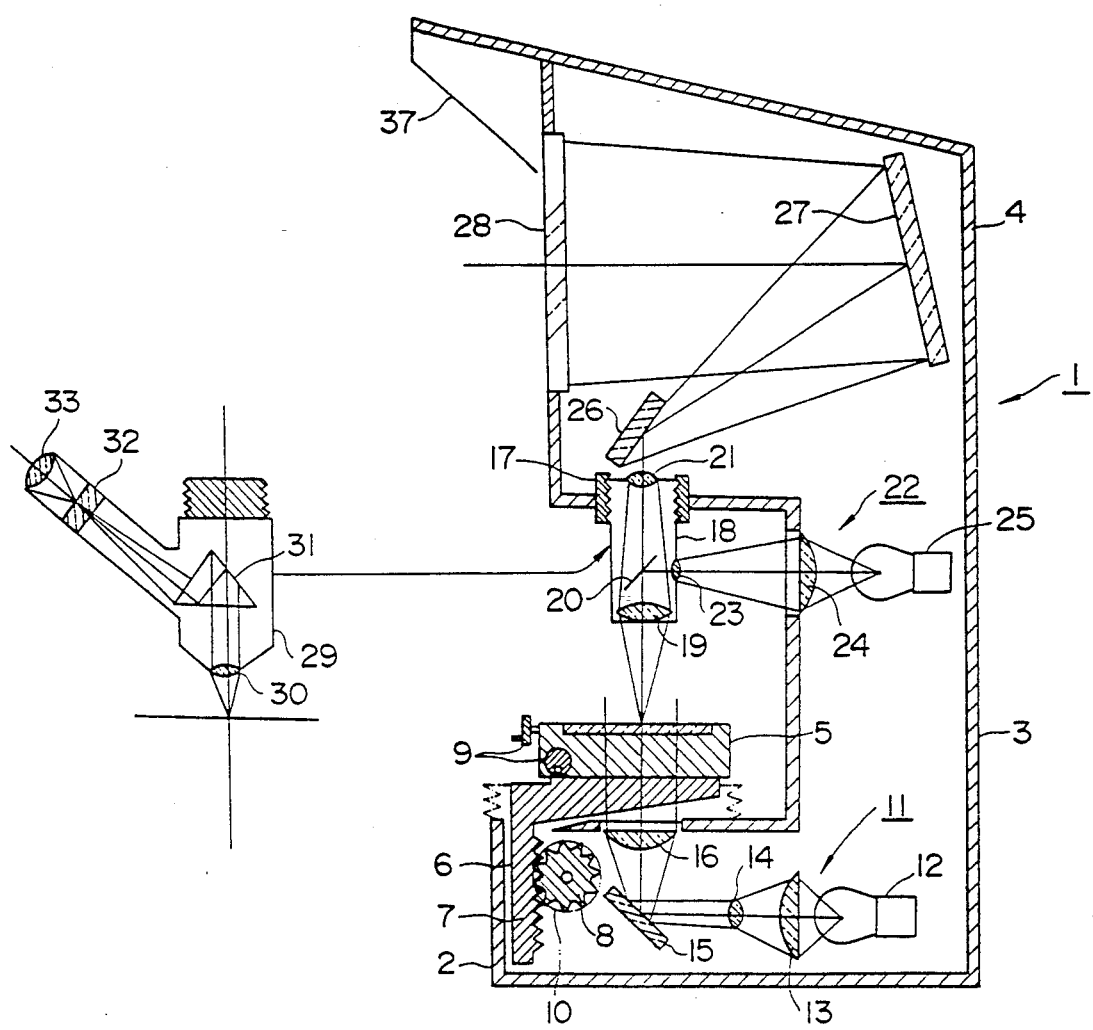
FIG. 1 is a vertical sectional view showing a first embodiment of a projection inspecting machine according to the present invention.
Figure 2:
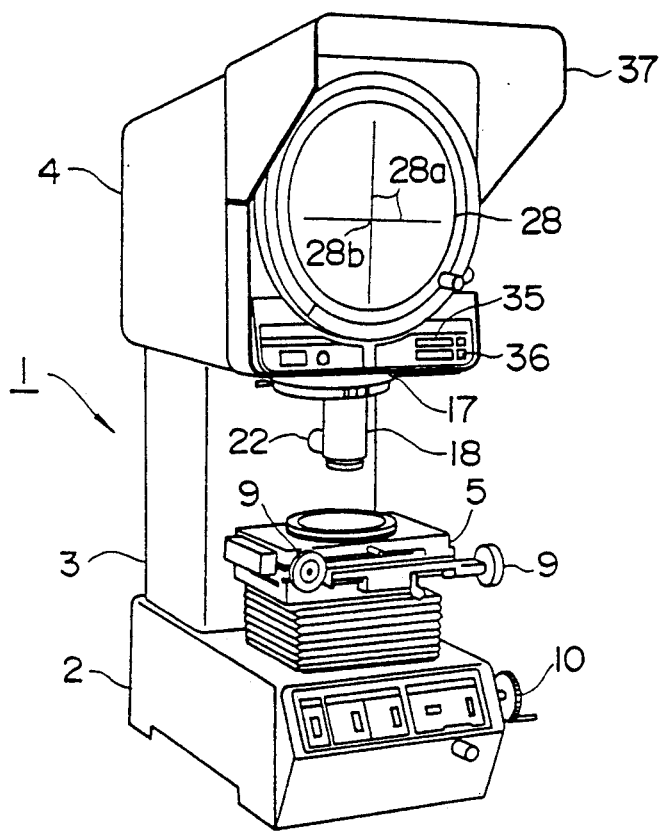
FIG. 2 is a perspective view showing a first embodiment of a projection inspecting machine according to the present invention, in which a projection lens mount is already attached to a projection lens mount attaching portion.
Figure 3:
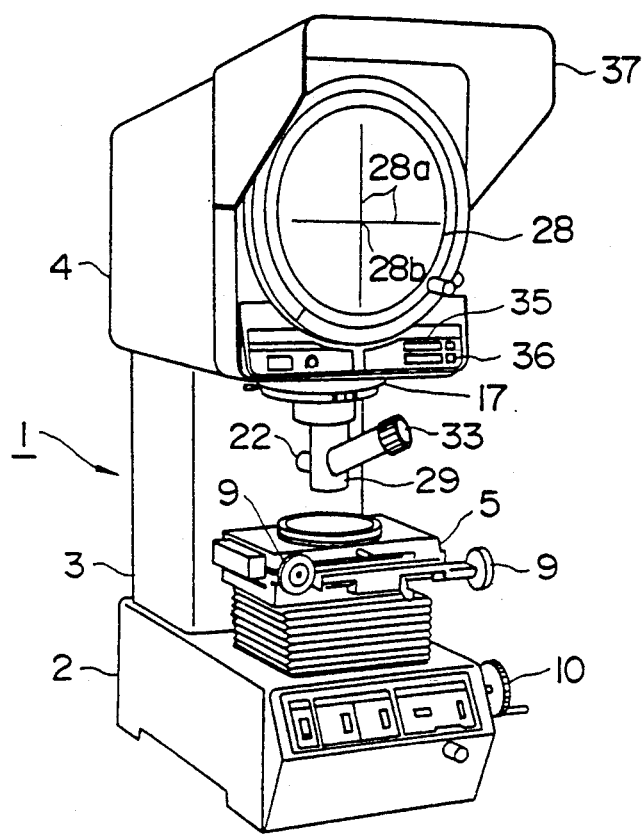
FIG. 3 is a perspective view, similar to FIG. 2, but in which a microscope mount, instead of the projection lens mount of FIG. 2, is attached to the projection lens at taching portion.

FIGS. 1 through 4 show a first embodiment of a projection inspecting machine according to the present invention. In FIGS. 1 through 3, the numeral 1 denotes a projection inspecting machine main body. This main body 1 generally comprises a frame portion 2, a column portion 3, and a screen portion 4. The frame portion 2 is provided with an X-Y table 5 adapted to support an object to be measured (hereinafter simply referred to the "object") placed thereon. The X-Y table 5 is connected to a focusing mechanism 6. This focusing mechanism 6 generally comprises a rack 7, and a pinion 8. The X-Y table 5 is moved two-dimensionally by manipulating a moving handle 9, and likewise moved upward and downward by manipulating a focusing handle 10. The frame portion 2 has a transmission illumination optical system 11. This transmission illumination optical system 11 generally comprises a lamp 12, a condenser lens 13, a zoom lens 14, a mirror 15, and a collimate lens 16. The transmission illumination optical system 11 is operated to illuminate the object (not shown) placed on the X-Y table 5 from under the table 5. The zoom lens 14 is adapted to vary the range of illumination of a transmission illumination light in accordance with the range of observation which can be varied by varying observation power of an ocular optical system as later described.

A projection lens mount attaching base 17 is disposed above the X-Y table 5 and below the screen portion 4. A projection lens mount 18 acting as a part of a projection optical system as later described is threadedly engaged with the projection lens mount attaching base 17. The projection lens mount 18 generally comprises a projection lens 19, a half mirror 20, and a condenser lens 21. The half mirror 20 is commonly used also by a reflection illumination optical system 22. This reflection illumination optical system 22 generally comprises condenser lenses 23, 24, and a lamp 25. The condenser lens 24 and lamp 25 are mounted on the column portion 3, while the condenser lens 23 is mounted on the projection lens mount 18. An illumination light from the lamp 25 is irradiated to the X-Y table 5 through the condenser lenses 24, 23, the half mirror 20, and the projection lens 19. This illumination light is reflected by the object on the X-Y table 5 and therefore, becomes a reflected illumination light. This reflected illumination light is allowed to pass through the projection lens mount 18 and guided to the screen portion 4. The screen portion 4 is provided with mirrors 26, 27. The screen portion 4 constitutes the projection optical system together with the projection lens mount 18. An image of the object is formed on a mat screen 28 through the projection optical system. The mat screen 28 is disposed in front of the screen portion 4. A reference target 28a having a cross pattern is formed on the mat screen 28. An edge sensor (not shown) acting as a photoelectric element is disposed at a location corresponding to a crossing point 28b of the reference target 28a. This edge sensor is adapted to detect an edge of the object so as to use the same for adjusting the zero point of X, Y coordinates at the time when a range finding is performed. The projection lens mount 18 is removable from the projection lens mount attaching base 17. After the projection lens mount 18 is removed from the projection lens mount attaching base 17, a microscope mount 19 can be threadedly engaged with the base 17. The microscope mount 29 generally comprises an objective lens 30, a prism 31, an aiming plate 32, and an eye piece 33. The aiming plate 32 is provided with a reference target 34 having a cross pattern. The microscope mount 29 generally constitutes the ocular optical system. When it is required to observe the object through the eye piece, the microscope mount 29 is threadedly engaged with the projection lens mount attaching base 17 and in that state, the image of the object is caused to be formed on the aiming plate 32 for observation. The numeral 32 denotes a moving amount indication portion adapted to indicate a moving amount of the X-Y table 5, the numeral 36 denotes a reset button operated to reset the indication of the moving amount indication portion 35, and the numeral 37 denotes a shading plate.

Figure 4:
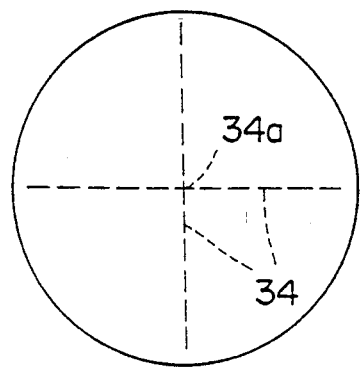
FIG. 4 is a schematic view showing a view field of an ocular optical system.

When it is found to be difficult to measure the size, etc. of the object by means of observation of the image projected onto the mat screen 28, the observation is carried out using the microscope mount 29. As shown in FIG. 4, the X-Y table 5 is moved either in an X-direction or in a Y-direction by the moving handle 9 in order to bring the crossing point 34a of reference target 34 formed on the aiming plate 32 to a measuring point of the object which is already placed on the X-Y table 5. When the crossing point 3 is brought to be coincident with the measuring point, the X, Y coordinates of the moving amount indication portion 35 is reset to (0, 0) by the reset button 36, and the object is measured serving this point as an origin. The result of measurement is indicated on the moving amount indication portion 35. The arrangement may be modified such that a photoelectric element (not shown) such as, for example, an edge sensor is disposed at a location corresponding to the crossing point 34a on the aiming plate 32, and a zero point adjustment of the X, Y coordinates is performed by detecting the edge of the object, thereby enabling to measure the object.

Figure 5:
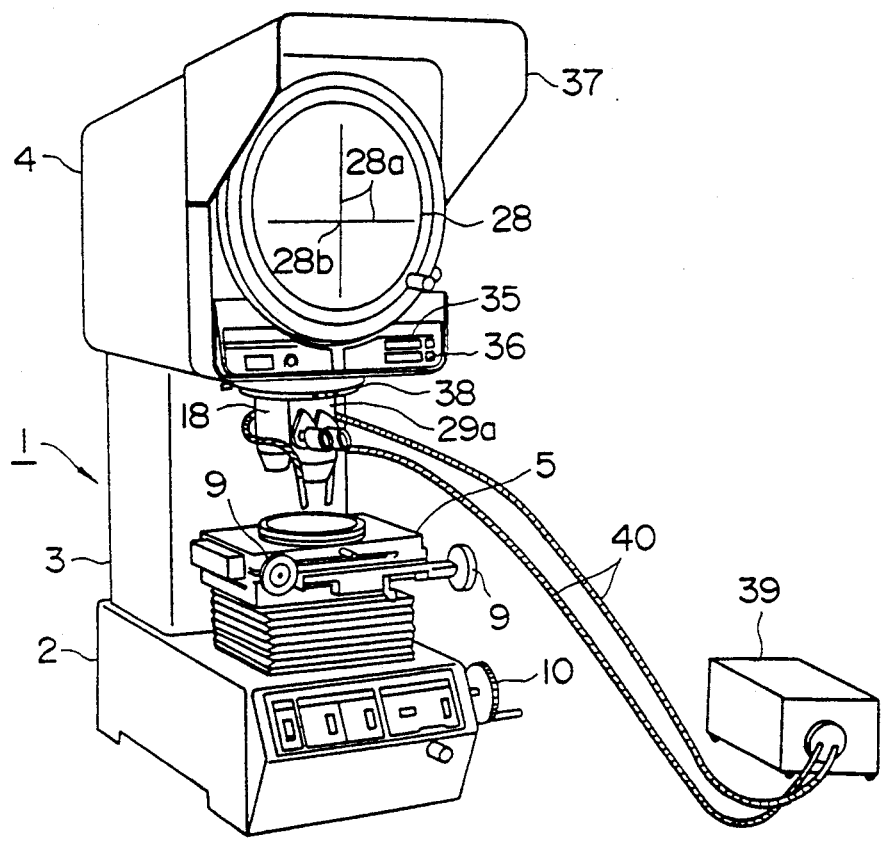
FIG. 5 is a perspective view showing a second embodiment of a projection inspecting machine according to the present invention.

FIG. 5 shows a second embodiment of a projection inspecting machine according to the present invention. A turret plate 38 is rotatably disposed at a lower part of the screen portion 4. This turret plate 38 is provided with two projection lens mount attaching bases. The projection lens mount attaching bases are provided with projection lens mounts 18 having different magnification powers respectively. When it is desired to observe the object by the eye piece, one of the mounts 18 is removed, and a binocular type microscope mount 29a is attached to that projection lens mount at taching base from where the mount 18 is removed. In this way, the inspection mode can be rapidly switched between the projection observation inspection mode and the ocular observation inspection mode. The numeral 39 denotes a case for an illumination light source. This case 39 contains an optical element (not shown) constituting the reflection illumination light optical system. An illumination light from the illumination light source is irradiated to the X-Y table 5 from above the table 5 through an optical fiber member 40. A distal end portion of the optical fiber member 40 is removably attached to an outer peripheral portion of the microscope mount 29a by a fastener (not shown).

Figure 6:
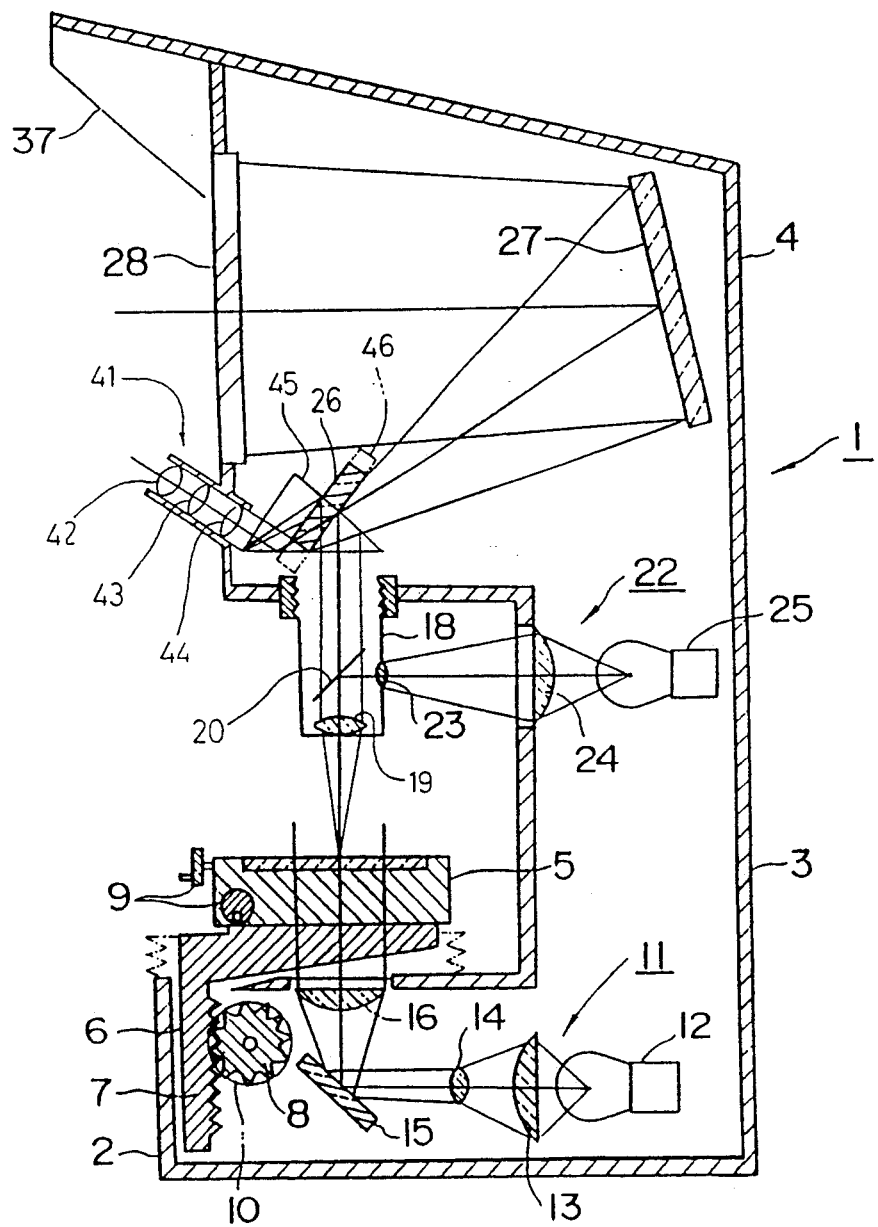
FIG. 6 is a vertical sectional view showing a third embodiment of a projection inspecting machine according to the present invention.
Figure 7:
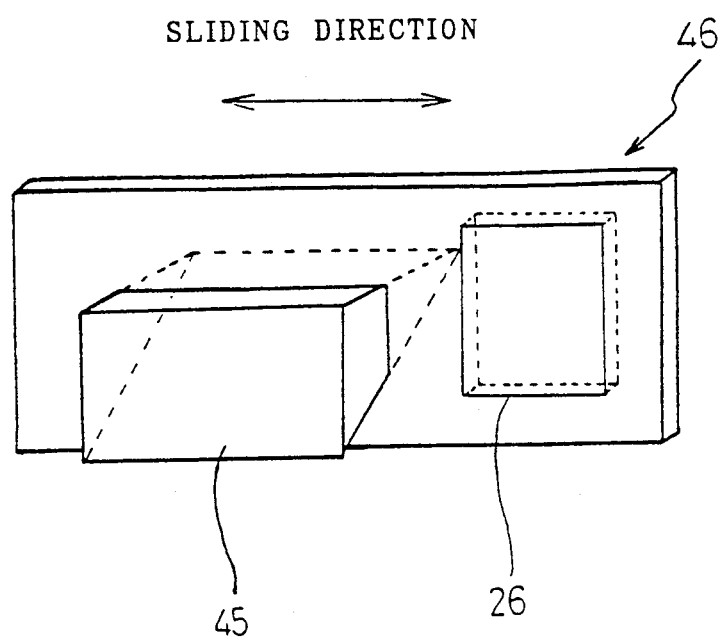
FIG. 7 is an enlarged perspective view of an optical system switch board acting as an optical system switch means.

FIG. 6 shows a third embodiment of a projection inspecting machine according to the present invention. The projection inspecting machine main body 1 is provided with a lens-barrel portion 41 of the microscope. This lens-barrel portion 41 generally comprises an eye piece 42, an aiming plate 43, and an imaging lens 44. The eye piece 42 and aiming plate 43 are generally of the same constitutional elements as the eye piece 33 and aiming plate 32 of the first embodiment. An optical system switch plate 46 acting as a switch means for an optical system provided with the mirror 26 and a prism 45 is disposed within the screen portion 4. FIG. 7 shows a general construction of the optical system switch plate 46. This switching operation can be made by any suitable means (not shown) such as manual means and electric means.

With the above-mentioned construction, when the object is observed by the mat screen 28, the switch plate 46 is moved to bring the mirror 26 to be coincident with the imaging lens 44. Since the mirror 26 is a total reflection mirror, the image of the object does not reach the lens-barrel portion 41, but it is projected to the mat screen 28 through the mirror 27. When the object is desired to be observed by ocular observation, the optical system switch plate 46 is moved to bring the prism 45 to be coincident with the imaging lens 44. At that time, the image of the object reaches the imaging lens 44 through the prism 44 and observed through the eye piece 42. As in the first embodiment, the object is measured using the reference target 34 on the aiming plate 32. In the third embodiment, the imaging lens 44 is disposed at the lens-barrel portion 41. Alternatively, it may be disposed at a surface of the prism 45 opposite to the lens mount 18. Furthermore, in this embodiment, the projection lens 19 of the projection lens mount 18 can be exchanged to another lens having different power, the object can be ocular observed with high power. The present invention is of course not limited to the above embodiments.

What is claimed is:

1. A projection inspecting machine comprising a table capable of moving two-dimensionally and adapted to support an object to be measured, and a projection lens mount attaching base constituting a part of a projection optical system, disposed above the table and adapted to serve as a base to which a projection lens is to be attached, an observation inspection being carried out by observing an image of the object to be measured, the object projected onto a screen by means of emission of an illumination light through the projection optical system, wherein a projection lens is removably attached so as to be exchanged by a microscope mount including an ocular optical system, a reference target being provided within a view field of the ocular optical system, the table being provided with a moving amount indicating portion capable of indicating a moving amount thereof.

* * * * *